E. G. CALKINS.
COMBINED CORN HARVESTING AND HUSKING MACHINE.
APPLICATION FILED APR. 27, 1907.
905,408.
Patented Dec. 1, 1908.
5 SHEETS—SHEET 1.
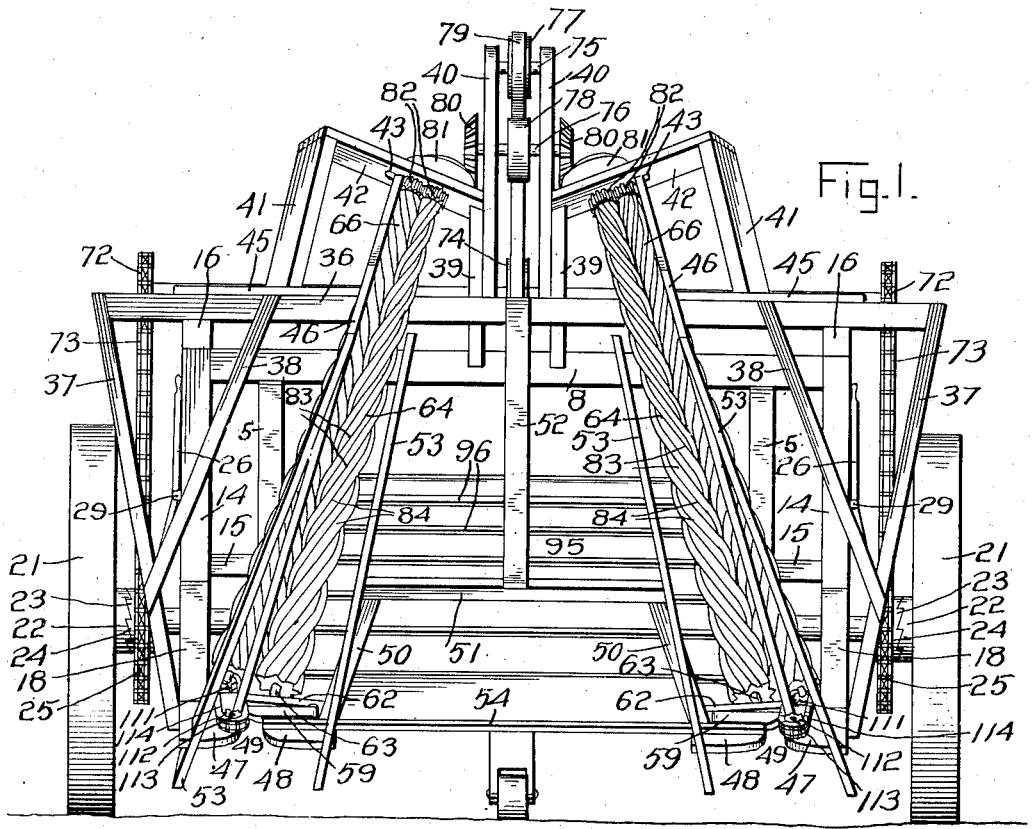
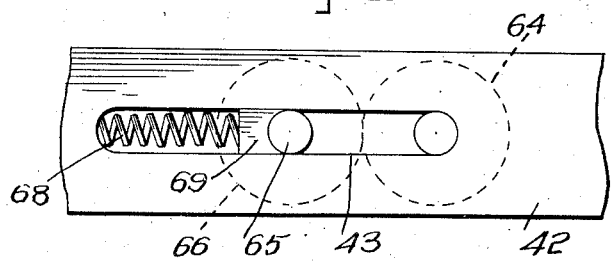

E. G. CALKINS.
COMBINED CORN HARVESTING AND HUSKING MACHINE.
APPLICATION FILED APR. 27, 1907.
905,408.
Patented Dec. 1, 1908.
5 SHEETS—SHEET 2.
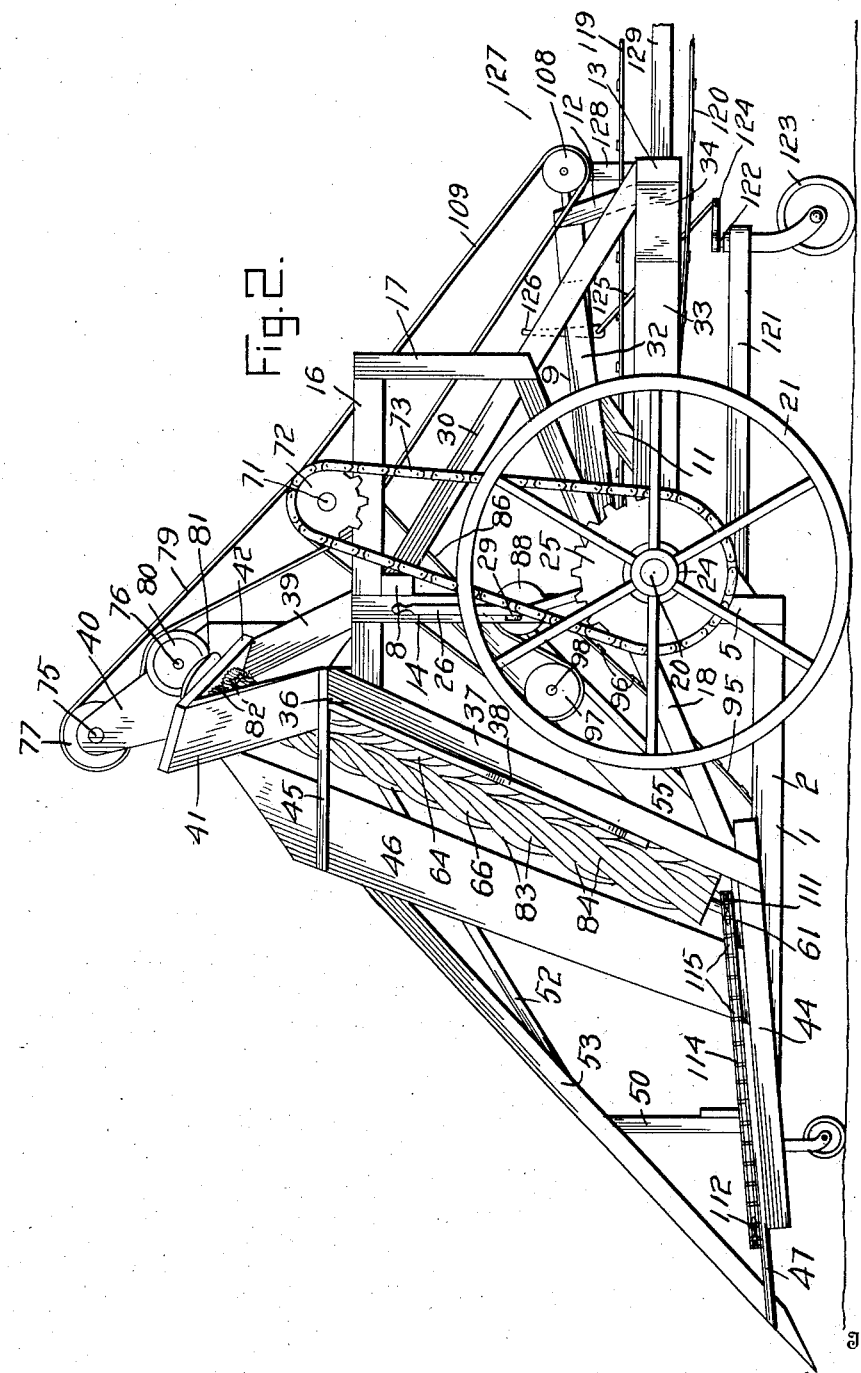

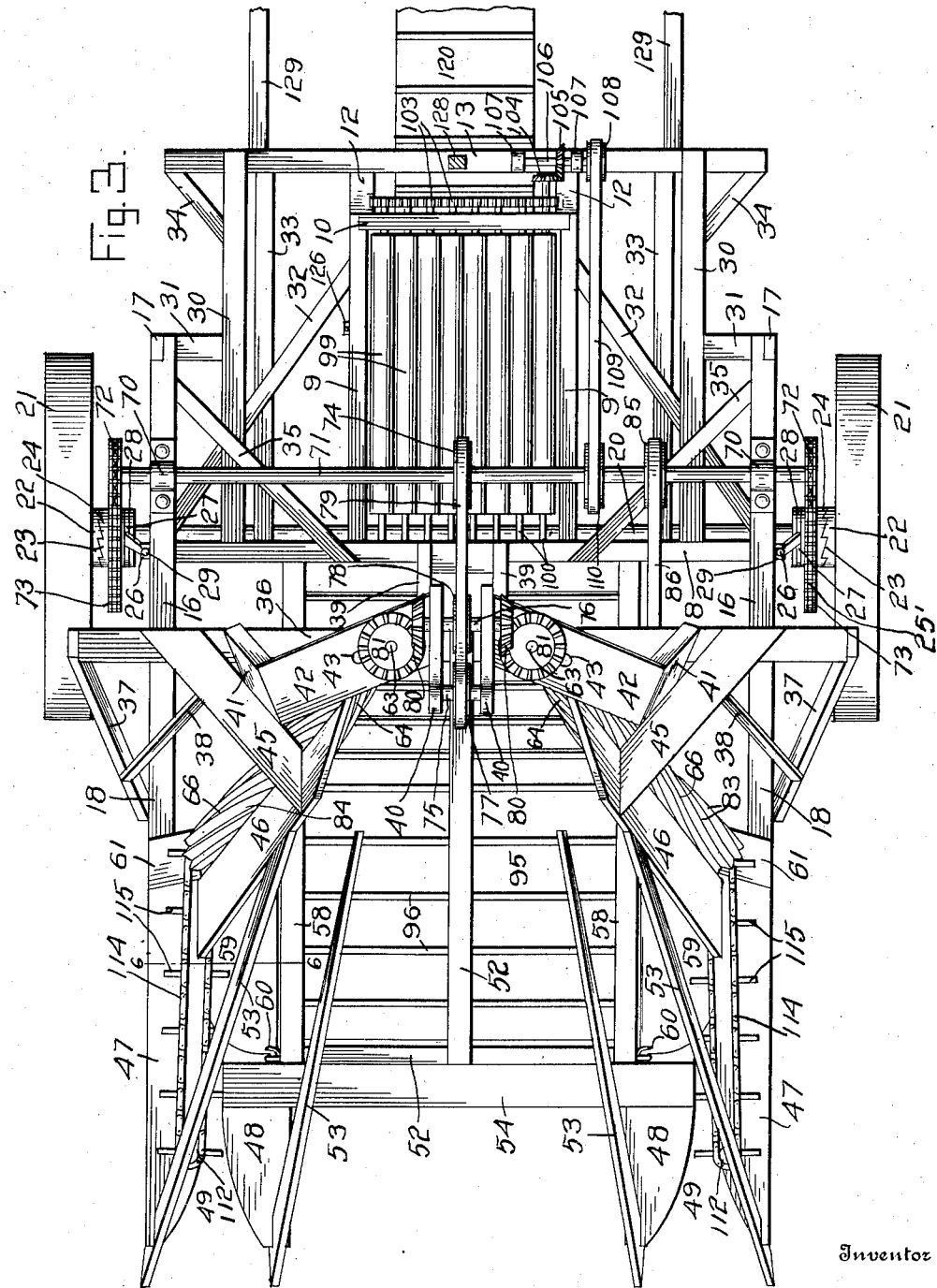

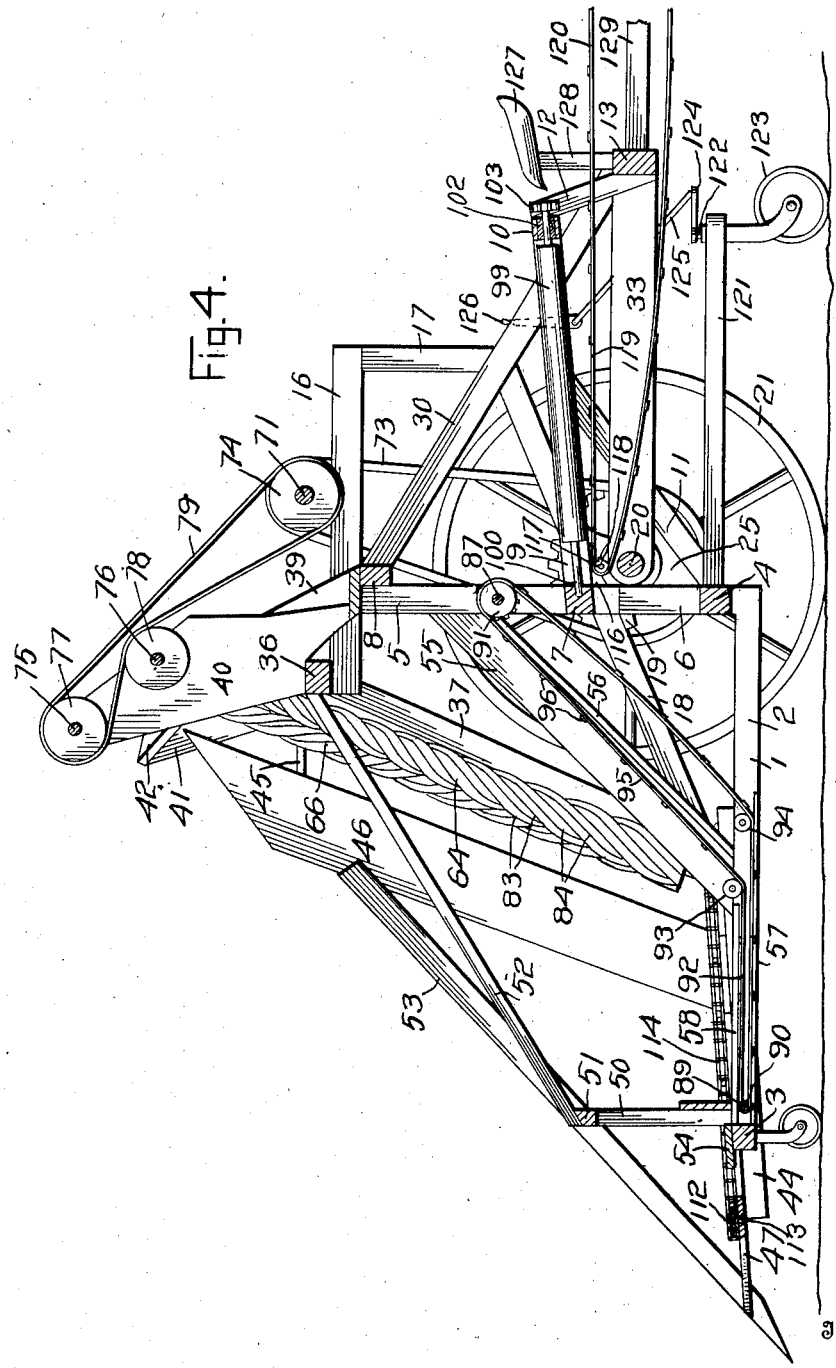

E. G. CALKINS.
COMBINED CORN HARVESTING AND HUSKING MACHINE.
APPLICATION FILED APR. 27, 1907.
905,408.
Patented Dec. 1, 1908.
5 SHEETS—SHEET 5.
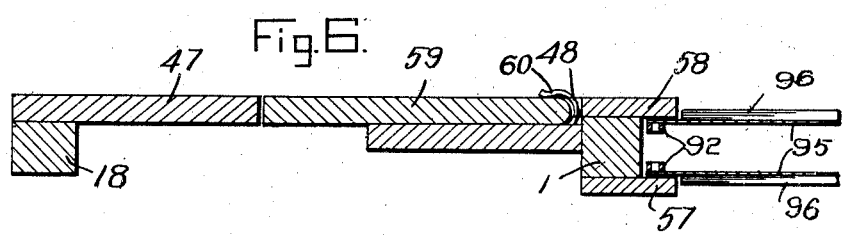
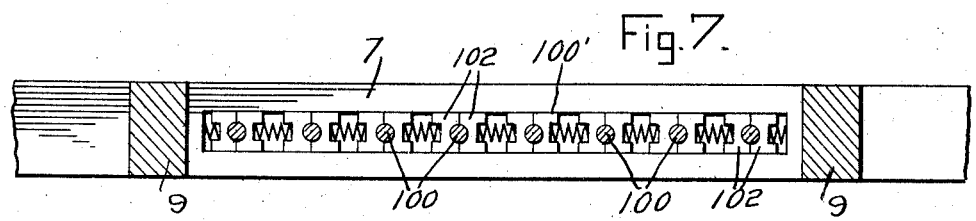
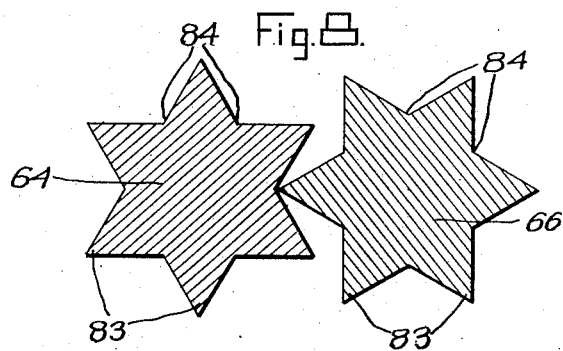
Witnesses
C. K. Reichenbach
John S Powers
Inventor
Edgar G. Calkins
By Chandler & Chandler
Attorneys

UNITED STATES PATENT OFFICE.

EDGAR G. CALKINS, OF GRAND ISLAND, NEBRASKA.

COMBINED CORN HARVESTING AND HUSKING MACHINE.

No. 905,408.　　　　Specification of Letters Patent.　　　Patented Dec. 1, 1908.

Application filed April 27, 1907. Serial No. 370,725.

*To all whom it may concern:*

Be it known that I, EDGAR G. CALKINS, a citizen of the United States, residing at Grand Island, in the county of Hall, State of Nebraska, have invented certain new and useful Improvements in a Combined Corn Harvesting and Husking Machine; and I do hereby declare the following to be a full, clear, and exact description of the invention, such as will enable others skilled in the art to which it appertains to make and use the same.

This invention relates to new and useful improvements in machines for snapping and husking corn, and it has particular reference to a machine propelled by draft animals for husking the corn in standing rows.

The invention in its general application is designed to have simultaneous action upon two adjacent rows of corn and it includes snapping rollers for removing the ears from the stalks, husking rollers for stripping the husks from the ears, conveyers interposed between the snapping rollers and the husking rollers and, essential minor details coacting with the elements above recited.

In connection with a machine of the above type the invention aims as a primary object to provide a novel construction, combination, and arrangement of parts, the details of which will appear in the course of the following description, in which reference is had to the accompanying drawings, forming a part of this specification, like characters of reference designating similar parts throughout the several views, wherein:—

Figure 1 is a front elevation of the machine constructed in accordance with the present invention. Fig. 2 is a side elevation thereof. Fig. 3 is a top plan view thereof. Fig. 4 is a central longitudinal section thereof. Fig. 5 is a detailed section illustrating the bearings for the upper ends of the snapping rollers, such bearings being substantially duplicated at the lower end of said rollers. Fig. 6 is a transverse section on the line 6—6 of Fig. 3, showing the guides arranged at each side of the lower portion of the conveyer, above referred to. Fig. 7 is a section illustrating the bearings which permit the husking rollers to yield with relation to one another. Fig. 8 is a transverse sectional view illustrating the conformation of the snapping rollers.
Referring specifically to the accompanying drawings the numeral 1 designates what is termed for convenience of description and illustration, the main frame, and from which the various operative elements are supported by means of suitable connections. The frame 1 is of rectangular shape and comprises the side bars 2, the front cross bar 3, and the rear cross bar 4. The cross bar 4 carries at its end spaced vertical parallel posts 5, which are braced with relation to said cross bar by diagonal braces 6, and with relation to one another by a transverse connecting brace 7. The posts 5 conjointly support at their upper ends a transverse bar 8 projecting for an equal distance on each side beyond said respective posts. The brace 7 supports rearwardly extending inclined parallel bars 9 which constitute elements of the frame for the husking rollers and in this function coact with the brace 7, and with the rear end cross bar 10. The bars 9 are reinforced with relation to the bar 4 by diagonal braces 11. The bar 10 is provided with depending hangers 12, which have connection at their lower end with a transverse bar 13, preferably coextensive with the bar 8. The bar 8 carries at its end depending posts 14, arranged in spaced parallel relation to the respectively adjacent posts 5, and braced with respect thereto by transverse connecting members 15. The posts 14 constitute elements of auxiliary frames arranged at each side of the machine, and comprising longitudinal top bars 16, fixed to the bar 8, vertical end bars 17, and forwardly and downwardly inclined lower bars 18, having connection with the bars 17, and posts 14, and projecting forwardly from the latter. The bars 18 are provided at corresponding points rearwardly of the frame 1 with bearings 19, constituting supports for a transverse axle 20, upon the ends of which the traction wheels 21 are loosely mounted, the latter being of proportions to support the frame 1 at a distance of about a foot above the ground. The wheels 21 are each provided on their inner surfaces with clutch faces 22, which coact with similar faces 23, provided on the outer ends of castings 24, the latter being mounted for sliding movement on the axle 20, and being provided with sprocket wheels 25. The castings 24 are moved to engage or disengage their faces 23 with relation to the faces 22 by a lever 26, terminating in a yoke 27 engaged in an annular peripheral groove 28, provided in said castings, and pivoted between its ends, as at 29. The bar 13 is braced with relation to the bar 8 by diagonal connecting members 30, the latter being braced by transverse connections 31 arranged between the same and the bars 18. The bars 9 are also braced by diagonal connecting members 32 connected with the rear ends of said bars and with the bars 18. The bar 13 adjacent its ends is provided with forwardly extending members 33, which at their front ends loosely surround the shaft 20, said members being braced by a diagonal connection 34 between the same and the ends of the bar 13. The bars 16 of the auxiliary frame are likewise braced with relation to the bar 8 by a diagonal connection 35.

The bars 16 at their projecting front ends support a transverse bar 36 which is strengthened by vertically inclined members 37 between the same, and the front ends of the bars 18, said members 37 being reinforced by braces 38 between the same, and the bar 36. The bar 8 carries approximately central thereof spaced, parallel forwardly and upwardly inclined bars 39, which adjacent their upper ends support bracket bearings 40.

The bar 36 is provided at a distance from its ends with forwardly and upwardly inclined bars 41, which are connected with the upper ends of the bars 39 by members 42 provided with longitudinal slots 43. The bars 18 at their lower ends are each connected with forwardly projecting bars 44, which, together with forwardly converging members 45 supported from the bar 36, constitute supports for vertical rearwardly inclined deflectors 46 converging towards one another at their upper ends.

The bars 46 support forwardly projecting guides 47, having curved inner deflecting faces and similar guides 48 are supported from the front portion of the frame 1, the guides 48 having their outer faces curved and being arranged in spaced relation to the guides 47 so that a flaring passage 49 occurs therebetween. For the purpose of strengthening the front part of frame 1 upwardly converging vertical posts 50 are supported therefrom, the posts 50 being braced with relation to one another by transverse connecting members 51. A longitudinal connecting member 52 is provided between the uppermost of the member 51 and the bar 36, centrally thereof. The guides 48 at their front ends have connection with diagonal members 53. It is to be noted that the guides 48 are braced with relation to one another by a transverse connecting member 54. The front portion of the frame 1 incidentally serves as a conveyer frame, and in this function coöperates with inclined side bars 55, arranged between the side bars 2, and between the posts 5, said bars 55 together with the front portion of the side bars 2, being provided with respective cleats 56 and 57 which define the movement of the centrally located conveyer. The side bars 2 are provided above the cleats 57 with spaced overhanging cleats 58, which coact with the respectively adjacent cleats 57, to direct a portion of the travel of said conveyer in a horizontal plane.

It has been stated that a passage 49 occurs between the guides 47 and 48. The stalks are fed into this passage by chains to be hereinafter described, and for the purpose of preventing any retrogradation of said stalks, leaves 59 are hinged to the guides 48, and are normally held to close the passages 49 by a spring 60. The bars 44 are each provided with horizontal bracket bearings 61 and the adjacent bars 2 are provided with bracket bearings 62. The bracket bearings 62 are constructed to receive therethrough the lower trunnion 63 of inner snapping rolls 64, the upper trunnions of which are projected through the slots 43 in the members 42. Said slots also receive the upper trunnion 65 of outer snapping rollers 66, the lower trunnions of which are received in the bracket bearings 61, the latter being formed with slots 67 for this purpose. The trunnions 65 of the outer snapping rollers 66 are yieldably mounted in their respective slots 43 and 67 and to this end are pressed, so as to hold the rollers 64 and 66 in contacting relation by springs 68 bearing against follower plates 69, the latter serving also the function of bearings.

The top bars 16 are provided with bearings 70 which constitute supports for a transverse shaft 71, having its ends projected beyond said bearings and provided with sprocket wheels 72, the latter being driven by a chain 73 from the sprocket wheels 25 previously referred to. The shaft 71 carries a centrally located pulley 74. Between the bracket bearings 40 are respective upper and lower transverse shafts 75 and 76 carrying respective centrally located pulleys 77 and 78, the pulley 77 constituting an idler, and, conjointly with the pulley 74, supporting a drive belt 79, the latter being trained over the pulley 78, and by virtue of such relation driving the shaft 76. The latter carries on its projecting ends beveled pinions 80, which mesh with similar larger pinions 81 on the projecting upper trunnion 63, thus affording a positive drive connection for the inner snapping rollers. The rolls 64 and 66 are provided beneath the members 42 with pinions 82 by means of which the rollers 66 are driven from the rollers 64. It is to be noted that said rolls are counterparts in construction and are provided with oppositely extending alternately arranged spirally directed ribs and grooves 83 and 84 by means of which the ears are snapped from the stalks. It is preferred to form said rolls of tapering contour towards their upper ends, in order that the upper or lower portions thereof, may yield without disrupting the entire contacting relation therebetween. The shaft 71 is provided at one side thereof with a pulley 85, which, through the medium of a belt 86 drives a transverse shaft 87, having its ends journaled in the posts 5, one of the ends of the shaft 87 projecting and carrying a pulley 88, over which the chain 86 is trained. Rearwardly of the front bar 3 is a transverse shaft 89, having its ends journaled in the side bars 2, and provided adjacent said ends with sprocket wheels 90 arranged at each side thereof.

Coincidently arranged sprocket wheels 91 are provided on the shaft 87 and chains 92 are trained over the respective sprocket wheels 90 and 91, said chains having movement on each side of the cleats 56 and 57, and being trained over sprockets 93 and 94 arranged on the respective side bars 55 and 2. The chains 92 conjointly support an endless conveyer belt or apron 95, provided with the usual transverse slats 96. It is preferred that the chain 86 be trained over an idler sprocket 97 carried upon a stub shaft 98 journaled in the side bar 55 adjacent the sprocket 88.

The husking rolls are designated by the numerals 99 and are supported longitudinally of the frame between the bars 10 and 7, said husking rollers having trunnions 100 projected through slots 100' in said bars 10 and 7 and journaled in spring pressed bearings 102 which permit said husking rolls to yield with relation to one another. The rear trunnions 101 are projected beyond the bar 10 to carry intermeshing pinions 103, and one of said rear trunnions carries at its end a bevel pinion 104 which meshes with a similar pinion 105 carried upon a shaft 106 supported transversely in bearings 107 provided therefor on the bar 13. The pinion 105 is provided between the bearings 107 and the shaft 106 at one end projected beyond said bearings to carry a pulley wheel 108, which is driven by a belt 109 from a pulley 110, provided on the shaft 71.

The lower trunnions 65 of the snapping rolls 64 are provided with universally mounted horizontal sprocket wheels 111, and similar sprocket wheels 112 are mounted on depending stub shafts 113, carried by the guides 47 sprocket chains 114 being trained over the pairs of respective sprockets 111 and 112. The chains 114 move through the passage 49 during a part of their travel and carry projecting fingers 115 designed to engage the stalks during the forward movement of the machine and to direct them into the passages 49.

From the bars 9 depend bracket bearings 116 in which is journaled the ends of the transverse shaft 117, provided adjacent its ends with sprockets 118 over which are chains 119, the latter being driven from a wagon following in the rear of the machine for receiving the corn. The chains 119 conjointly support an endless apron or belt 120 constituting a conveyer suitably constructed to receive the shelled corn from the rolls 99, and convey the same to the said wagon. The bar 4 is provided with a rearwardly extending member 121 in the end of which is swiveled the vertical shaft 122 of a caster wheel 123, by which the machine is steered, the said shaft 122 having a horizontal arm 124 pivoted to a suitably supported link 125 which at its end is in turn pivoted to an operating lever 126 having its handle in convenient proximity to the operator's seat 127, the latter being supported by a post 128 from the bar 13. Extending rearwardly from the bar 13 are the tongues or shafts 129, which at their rear ends carry the whiffle-trees (not shown) to which the draft animals are hooked and by means of which the machine is moved over the field, the draft animals being disposed rearwardly thereof.

The operation will be readily apparent from the foregoing description. As the machine is advanced the stalks are fed into the spaces 49 and are successively actuated upon by the rolls 64 and 66, said stalks passing through the spiral grooves 84 of said rolls. The ribs 83 snap the ears from the stalks and said ears are directed by the deflectors 46 upon the conveyer belt 95 from whence they are carried upwardly, discharging by gravity upon the husking rolls 99. The husks are stripped between said rollers, gravitate upon the conveyer 120, and are carried to the wagon, and the ears are fed forwardly by gravity, and drop upon the ground from the front end of the husking rollers and their frame. The whole mechanism may be thrown out of gear by the proper movement of the lever 26 to disengage the clutch faces 23 from the clutch faces 22, said lever having its handle in convenient proximity to the operator's seat.

In the action of this class of machines much trouble has heretofore occurred by the effects of vibration upon the spaced suspended parts, such vibration tending to shorten the life and decrease the efficiency of the machines, by virtue of the resultant wear and tear. The machine of the present invention has its parts so braced and interconnected that they are practically unaffected by vibration, and are at the same time properly arranged and constructed to attain the highest efficiency in use.

From the foregoing description it will be seen that simple and efficient means are provided for accomplishing the objects of the invention, but, while the elements herein shown and described are well adapted to serve the functions set forth it is obvious that various minor changes may be made in the proportions, shape, and arrangement of the several parts, without departing from the spirit and scope of the invention as defined in the appended claims.

What is claimed, is:—

1. A combined corn harvesting and husking machine, comprising a main rectangular frame, vertical posts extending from the rear ends thereof, a transverse bar supported from the upper ends of said posts, auxiliary frames supported from the ends of said transverse bar and each including a forwardly and downwardly projecting lower bar and a horizontal upper bar, spaced guides projecting in pairs forwardly beyond the respective side bars of said main frame and forwardly beyond said inclined lower bars, bracket bearings carried by each of the side bars of said main frame, bracket bearings supported adjacent each of said first named bracket bearings, a second transverse bar supported upon said horizontal upper bars, posts on each of said transverse bars, members connecting the upper ends of the posts of each bar, snapping rolls arranged in pairs at each side of the machine and having their trunnions journaled in said respective bracket bearings and in said members, a transverse axle supported from said inclined lower bars, traction wheels thereon, bearings carried by said horizontal upper bars, a transverse shaft journaled in said bearings, disengageable driving connections between said wheels and said shaft, a husking frame, husking rolls journaled therein, a central endless conveyer working between said snapping rolls and discharging above said husking rolls and operative driving connections between said shaft and said snapping rolls, said husking rolls and said conveyer.

2. A combined corn harvesting and husking machine comprising a main rectangular frame, vertical posts extending from the rear ends thereof, a transverse bar supported from the upper ends of said posts, auxiliary frames supported from the ends of said transverse bar, and each including a forwardly and downwardly projecting lower bar, and a horizontal upper bar, spaced guides projecting forwardly beyond the respective side bars of said main frame, and forwardly beyond said lower bars, bracket bearings carried by said side bars of said main frame, bracket bearings supported adjacent each of said first named bracket bearings, a second transverse bar supported upon said horizontal upper bars, posts on the upper side of said transverse bars, members connecting the upper ends of the posts of each bar, snapping rolls having their trunnions journaled in said bracket bearings, and in said members, upwardly and inwardly converging deflectors supported by said second transverse bar and said guides, said deflectors being each arranged adjacent the snapping rolls, a transverse axle supported between said inclined lower bars, traction wheels thereon, bearings on said horizontal upper bars, a transverse shaft journaled in said bearings, disengageable driving connections between said traction wheels, and said transverse shaft, a husking frame, husking rolls journaled therein, a central endless conveyer working between said snapping rolls, and discharging above said husking rolls, and operative driving connections between said shaft and said snapping rolls, said husking rolls and said conveyer.

3. In a combined corn harvesting and husking machine, the combination with a supporting frame, of two pairs of snapping rolls, a conveyer intermediate the same, husking rolls rearwardly of said conveyer, spaced forwardly projecting guides arranged in pairs in front of said snapping rolls, and a hinged spring-pressed leaf hinged to one of said guides, and held to lie upon the other and close the space between the same.

In testimony whereof, I affix my signature, in presence of two witnesses.

EDGAR G. CALKINS.

Witnesses:
D. F. SCOTT,
J. W. KEMPTON.